(12) United States Patent
Schneider et al.

(10) Patent No.: US 7,002,979 B1
(45) Date of Patent: Feb. 21, 2006

(54) VOICE DATA PACKET PROCESSING SYSTEM

(75) Inventors: Neal A. Schneider, Palo Alto, CA (US); Sridhar G. Sharma Isukapalli, Fremont, CA (US); Gary Tsztoo, Saratoga, CA (US)

(73) Assignee: UTStarcom, Inc., Alameda, CA (US)

( * ) Notice: Subject to any disclaimer, the term of this patent is extended or adjusted under 35 U.S.C. 154(b) by 861 days.

(21) Appl. No.: 09/927,569

(22) Filed: Aug. 10, 2001

(51) Int. Cl.
*H04L 12/56* (2006.01)

(52) U.S. Cl. ..................................... 370/412; 370/428

(58) Field of Classification Search ................ 370/389, 370/412, 428, 429
See application file for complete search history.

(56) References Cited

U.S. PATENT DOCUMENTS

| | | | |
|---|---|---|---|
| 4,156,112 A | 5/1979 | Moreland | |
| 4,534,024 A | 8/1985 | Maxemchuk et al. | |
| 4,771,425 A | 9/1988 | Baran et al. | |
| 5,303,344 A * | 4/1994 | Yokoyama et al. | 709/230 |
| 5,345,445 A | 9/1994 | Hiller et al. | |
| 5,477,541 A | 12/1995 | White et al. | |
| 5,526,353 A | 6/1996 | Henley et al. | |
| 5,566,170 A | 10/1996 | Bakke et al. | |
| 5,684,954 A | 11/1997 | Kaiserswerth et al. | |
| 5,790,538 A | 8/1998 | Sugar | |
| 5,793,978 A | 8/1998 | Fowler | |
| 5,867,677 A | 2/1999 | Tsukamoto | |
| 6,157,653 A | 12/2000 | Kline et al. | |
| 6,208,662 B1 | 3/2001 | O'Neill et al. | |
| 6,215,685 B1 | 4/2001 | Fung et al. | |
| 6,243,667 B1 | 6/2001 | Kerr et al. | |
| 6,311,212 B1 | 10/2001 | Chong et al. | |
| 6,343,072 B1 | 1/2002 | Bechtolsheim et al. | |
| 6,389,479 B1 * | 5/2002 | Boucher et al. | 709/243 |
| 2001/0030966 A1 | 10/2001 | Choi | |
| 2002/0038379 A1 | 3/2002 | Sato et al. | |

OTHER PUBLICATIONS

Yin et al. "Data Performance in an Integrated Packet Voice/Data System Using Voice Congestion Control". IEEE. Dec. 1998. pp. 517-521.*

Stallings, William. "Data and Computer Communications". Prentice Hall. Copyright 1997. p. 619.*

* cited by examiner

*Primary Examiner*—Ricky Ngo
*Assistant Examiner*—Derrick W Ferris
(74) *Attorney, Agent, or Firm*—Bradley T. Sako; Felix L. Fischer

(57) ABSTRACT

A system (100) for processing simplex and multiplexed voice packets transmitted over a network is disclosed. The system (100) may include a processor (102) and a compare section (104). A compare section (104) may include simplex identification (ID) entries (110–0) and multiplex ID entries (110-1). The compare section (104) can compare voice packet information with simplex ID entries (110-0) and multiplex ID entries (110-1) to correlate voice packet data with a give voice channel.

18 Claims, 8 Drawing Sheets

VOICE DATA PACKET PROCESSING SYSTEM

TECHNICAL FIELD

The present invention relates generally to systems for processing network voice data, and more particularly to systems that receive voice data in different forms.

BACKGROUND OF THE INVENTION

Conventionally, voice data remains separate from network data traffic. In particular, many enterprises will have a data network connecting a variety of workstations as well as a public branch exchange (PBX) for voice data. As data networks proliferate, it is becoming an increasingly desirable goal to integrate transmission of voice and data.

Transmitting data over voice systems can be inefficient, as such systems typically transmit voice and data in predetermined frames. Frames are allocated portions of bandwidth, usually formed according to a time division multiplexing scheme. In the event voice or data traffic drops, a frame may be transmitted with only voice or data, thus wasting available bandwidth.

Transmitting voice over a data network (voice over network) can provide advantages over other approaches. Voice over network can take advantage of existing network structures. Further, as noted above, networks (including the Internet) continue to grow in size and in bandwidth. Voice over network can be more efficient than data over voice as such systems are typically packet based. In a packet based system, bandwidth is used as needed. When data is transmitted, a data packet is sent through the network. When voice is needed, a voice packet is transmitted through the network.

Voice over networks can provide additional cost savings as voice may be transmitted between location without incurring conventional toll charges. This can be particularly true for systems that transmit voice over the Internet.

Many networks, can be "connectionless" networks. Connectionless networks can provide multiple possible paths between source and destination. Consequently, in some cases, voice transmitted over such networks may be more reliable as voice data can reach a destination even if some of the network nodes are not operational.

Voice over data networks may provide additional features in a cost-effective fashion. In a particular, transmitting voice over a data network may allow for "multicasting" of voice data (transmission of voice data to multiple destinations) and/or mixed media transmissions (voice and data) as but one example.

One type of voice of network approach utilizes the Internet protocol (IP), and is often referred to as voice-over-IP (VoIP).

Data networks may take a variety of forms. As noted above, a data network may be a connectionless network, including the Internet. Further, a network may include portions that overlaid and/or integrate connection-oriented legs. Such systems include internet protocol (IP) over asynchronous transfer mode (ATM), IP switching systems, and multiprotocol label switching (MPLS) or similar switching systems.

Various proposals for implementing voice over data networks have been proposed. One general approach is the idea of a network "gateway." A network gateway can provide access to a network (such as the Internet) for a variety of conventional voice data sources (voice channels). As but one example, a network gateway can be an IP gateway that integrates a PBX with an IP network. In such an arrangement, users may make telephone calls that appear entirely conventional, but are in fact being transmitted over a data network.

One drawback associated with voice over data networks can be latency. Latency is the delay introduced by the system into a voice transmission. Various sources may contribute to latency. A transmitting source introduces some delay in placing the voice into packet form. Typically the voice data can be digitized and/or compressed and then placed in packet form. Transmission of the voice over a data network can also introduce latency. Routing from node to node, or along a switching path, can consume additional time. Finally, a receiving destination can introduce delay. Voice data can be extracted from a packet and then transmitted along an appropriate voice channel. Such packet processing can be conventionally accomplished with a general purpose processor.

According to one conventional approach, a network voice packet can be forwarded to a destination according to conventional protocols, such as TCP/IP. A destination can include conventional network hardware, such as a network interface card, which can receive the packet. A general purpose processor can then extract voice data within the packet (including any decoding/decompressing) and then play the voice data over sound card, or the like. Such computation steps can contribute significantly to latency.

According to another conventional approach, a network can include a network phone (such as an "IP Phone"). A network phone can have its own network address, and include packet processing and voice data processing hardware.

One conventional way to decrease latency is with more complex routers. In particular, some routers may be capable of giving particular packets precedence over others. As but one example, some packet headers can include a "type of service" or "quality of service" field. A network voice packet can be given higher precedence than other packets, thereby reducing latency when compared to other packets. A drawback to such approaches is that all routers/switches in the network must have such an advanced processing capability, and thus can be expensive to implement. Consequently, such an approach may be better suited for enterprise wide area networks (WANs), instead of a larger network structure such as the Internet.

Another approach can essentially reserve a route for a voice packet flow. One such approach is the Resource ReserVation Protocol (RSVP). RSVP, like the precedence approach noted above, can rely on more complex routers and thus be an expensive solution.

While the approaches described above can reduce latency for voice packet data, such approaches may be difficult and/or expensive to implement. Further, it is still desirable to reduce latency even more. Thus, further ways of decreasing latency in network voice packets could a valuable contribution to voice over data networking.

While conventional packet forwarding of voice a data network may provide adequate results, this may not always be the case. To help improve the processing of time dependent data, including voice data, a number of protocols have been proposed. One such protocol is the Real-Time Transport Protocol (RTP). An RTP header can provide sequence and timestamp information than may help assemble voice data once it has been received.

Another concern that may arise out of voice over network systems is different possible voice data formats. Some formats may require different processing than others. Further, the processing of one voice format type may take longer and/or require more resources than other voice formats. Different voice formats may include, as but two of the many possible examples, "multiplexed" voice packets, which can contain voice data from multiple sources, and "simplex" voice packets, which may contain voice data form a single source. With the advent of multiplexed and simplex voice packets, systems may have to be capable of accommodating both types of voice packets.

The need for processing both simplex and voice data packets may further contribute to overall latency between a voice source and the resulting audio destination. Further, the processing of simplex and multiplexed voice data packets may add complexity to the instructions in conventional systems that store the packet to memory and then deprocess the packet according to instructions.

It would be desirable to arrive at a system that can improve the speed and efficiency at which simplex and multiplex voice data packets are processed.

SUMMARY OF THE INVENTION

According to one embodiment of the present invention, a voice data packet processing system may include a receive first-in-first-out buffer (FIFO) for storing data words of a received voice packet. In addition to voice packet data, each receive FIFO entry may store tag bits that can identify its voice packet data. Such tag bits may be used to "strip" unused packet data to arrive at a voice data payload.

According to one aspect of the embodiments, a tag bits may identify header information of a voice data packet. In particular, tag bits may indicate layer 2, layer 3 or layer 4 header information.

According to another aspect of the embodiments, data from a receive FIFO can be provided to a pre-processing path which may selectively forward FIFO entry data according to tag bit information.

DETAILED DESCRIPTION OF THE EMBODIMENTS

Various embodiments of the present invention will now be described with reference to a number of diagrams. The embodiments include a system for processing of different types of voice data. More particularly, systems are disclosed that identify particular voice packet types, than forward certain packets directly to a memory and other packets to a processing pipeline that may place the packets in a format for faster processing.

System.

Figure 1:
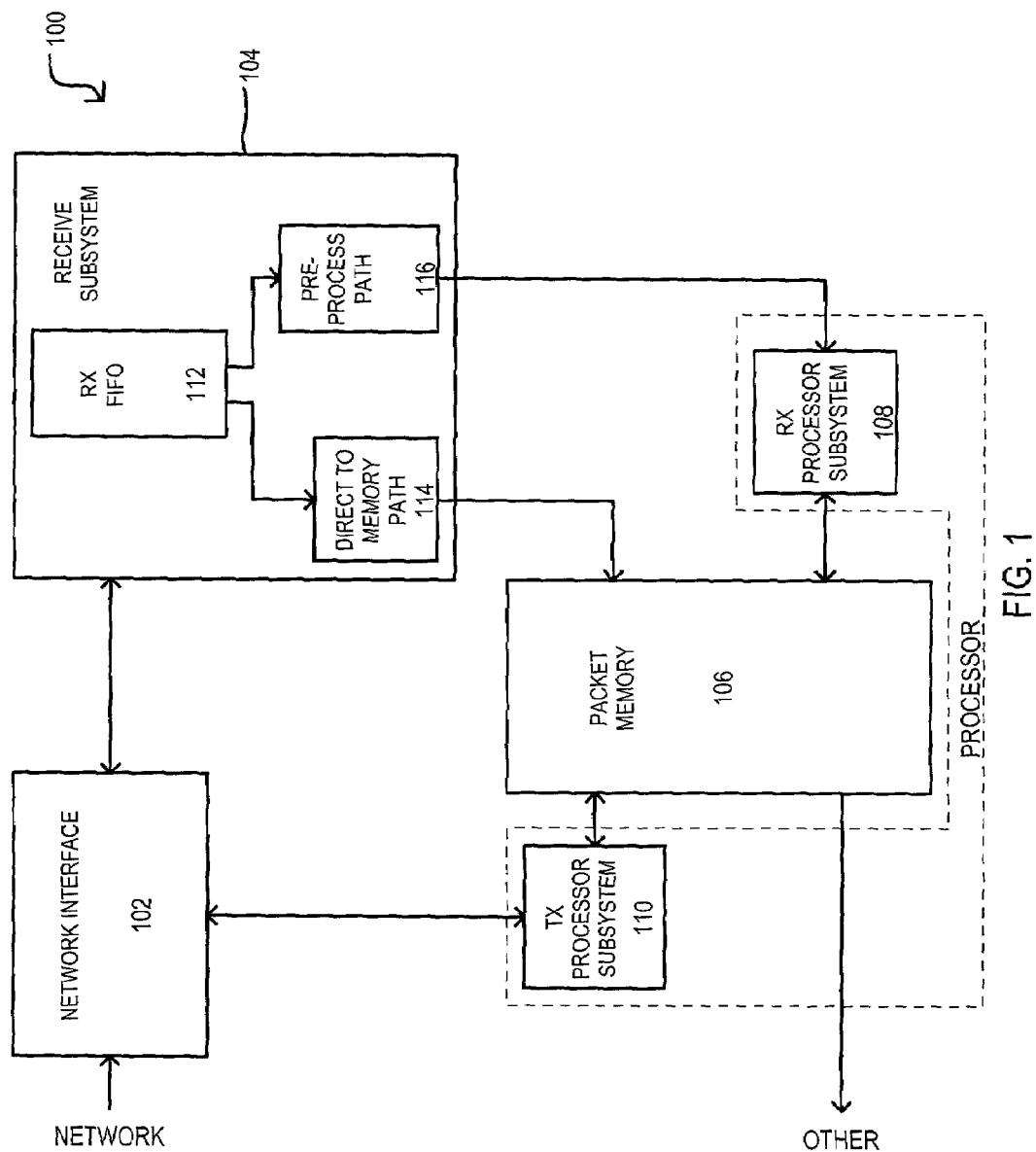
FIG. 1 is a block diagram of one embodiment.

Referring now to FIG. 1, a block diagram is set forth showing a system according to one embodiment. The system of FIG. 1 is designated by the general reference character 100, and may include a network interface 102, a receive subsystem 104, a packet memory 106, a receive (RX) processor subsystem 108, and transmit processor (TX) subsystem 110. A network interface 102 may receive network packets from a network. The received packets can be buffered within the network interface 102 and transmitted to the receive subsystem 104.

It is noted that a RX processor subsystem 108 and TX processor subsystem 110 are preferably a single embedded general purpose processor programmed to execute the various functional steps described for such subsystems. Of course, alternate embodiments could include a specialized processor, as but one example.

A receive subsystem 104 can monitor and buffer packets received from the network interface 102. Packets may be filtered within the receive subsystem according to predetermined criteria. More particularly, packets may be identified as particular types of voice packets. Packets received from network interface 102 may be stored in a receive first-in-first-out buffer (FIFO) 112.

According to a particular packet type, a packet can be forwarded from the RX FIFO 112 to a direct memory controller 114 or a pre-processor circuit 116. A direct memory controller 114 can control the transfer of packets from the RX FIFO 112 to the packet memory 106. In this way, a receive subsystem 104 may filter packets: those packets which pass the packet filter may be forwarded to a pre-processor circuit 116 and those packets which fail the packet filter may forwarded with a direct memory access (DMA) to a predetermined memory location. A pre-processor circuit 116 can pre-process filtered packets and forward such processed packets to a receive processor subsystem 108. Pre-processing packets can place packets into a form that is more conducive to extracting payload data.

A receive processor 108 can receive pre-processed packets from the pre-processor circuit 108. The receive processor 108 can extract desired data from the pre-processed packets and forward the extracted data to the packet memory.

In one particular arrangement, a receive subsystem 104 can filter for selected voice packets formats. Voice packets having a selected format can be output from the RX FIFO 112 to the pre-processor circuit 116. The pre-processor circuit 116 can be configured perform various operations on received voice packets, including but not limited to, removing and extracting header information from the packets.

In this way, a system 100 may include a receive subsystem 104 that filters packets and then forwards certain packets directly to a packet memory 106 and forwards other packets, such as voice packets, to a packet pre-processor circuit 116. A pre-processor circuit 116 may then remove non-voice data information, such as header information, for faster processing of a voice data payload.

Receive Subsystem.

Figure 2:
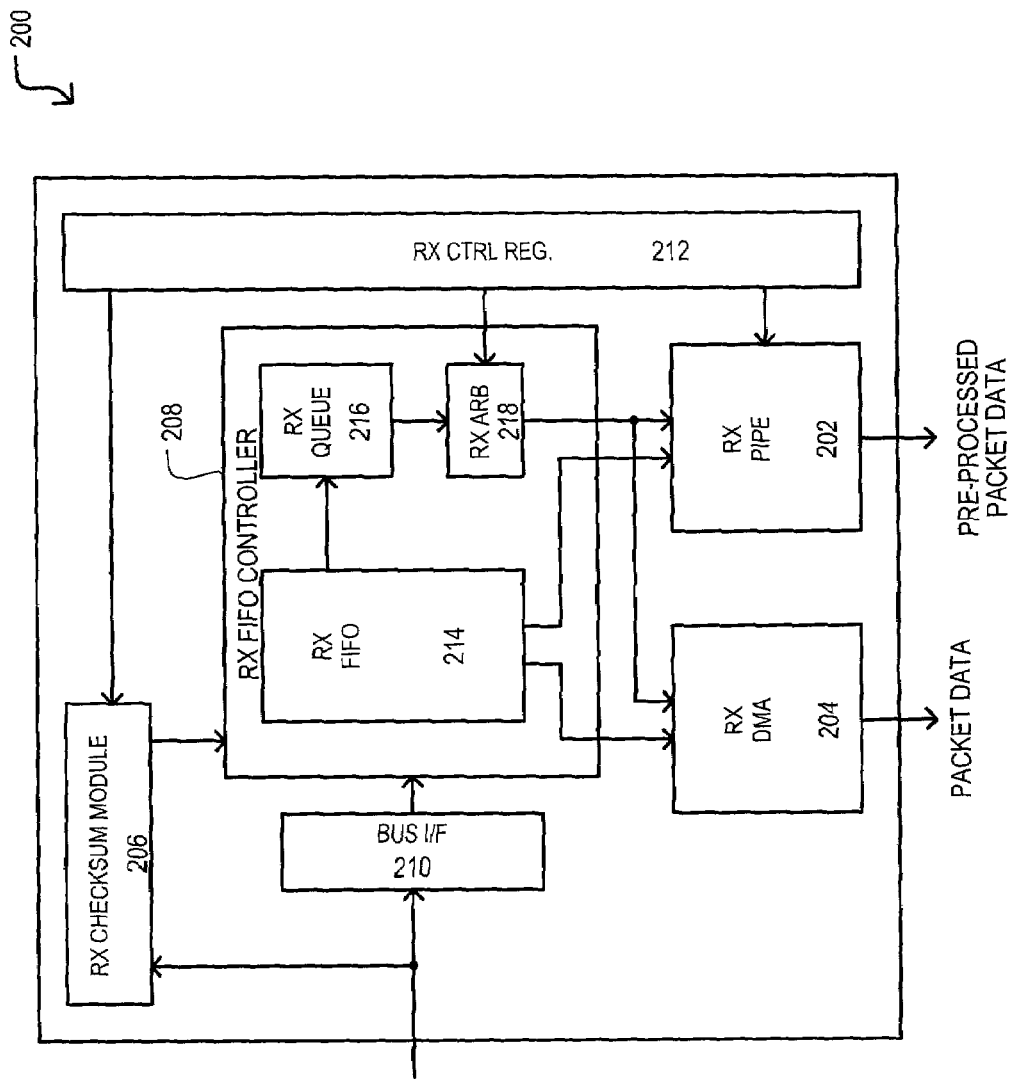
FIG. 2 is a block diagram of a receive subsystem according to one embodiment.

Referring now to FIG. 2, a more detailed block diagram is set forth illustrating a receive subsystem according to one embodiment. The receive subsystem is designated by the general reference character 200, and may correspond to the receive subsystem shown as item 104 in FIG. 1.

A receive subsystem 200 may include a receive direct memory access (DMA) circuit 204 and a receive pipeline 202 that may correspond to items 116 and 114, respectively, of FIG. 1. A receive subsystem 200 may further include a receive checksum module 206, a receive FIFO controller 208, a bus interface 210, and a receive control register 212.

A receive checksum module 206 may perform a variety of functions that can increase the rate at which packets are processed. Such functions can include filtering, the "tagging" of data words, checksum calculations, and the setting of various flags.

Filtering can include identifying particular packet types according to packet information. In one arrangement, certain packet header fields can be compared with predetermined values and/or ranges of values stored in the receive control register 212. More particularly, such values can filter particular voice packets from other network packets. In one arrangement, filtering can be performed by providing filter data for each packet to the RX FIFO controller 208. Particular filtering techniques will be described in more detail at a later point herein.

Tagging may include identifying portions of a packet to facilitate processing. More particularly, as portions of a packet are written to the RX FIFO controller 208, the RX checksum module can provide corresponding RX FIFO control data. The RX FIFO control data may include, as but two examples, data identifying particular layers of the packet and/or the start, middle, and end of a packet. Particular tagging approaches will be described in more detail at a later point herein.

As is well known, checksum calculations can be used to verify that a received packet, or portions thereof, have not been corrupted. Particular checksum approaches will also be described in more detail at a later point herein.

The setting of flags can be used to facilitate voice packet processing. For example, a RX checksum module may activate a particular flag to indicate that the packet is "good" (i.e., a valid voice data packet).

A RX FIFO controller 208 and RX checksum module 206 can receive packet data and interface status from a bus interface 210. In one particular arrangement, a bus interface can be a "virtual component interface" (VCI) bus according to specifications released by the Virtual Socket Interface Alliance (VSIA).

The RX FIFO controller 208 can also receive FIFO control data from the RX checksum module 206. The particular RX FIFO controller 208 of FIG. 2 may include a RX FIFO 214, a RX queue 216 and a RX arbitrator 218. A RX FIFO 214 may include a number of entries. An entry can store a portion of a packet. In addition, an entry may also store FIFO control data for its corresponding packet portion. The RX FIFO 214 can provide stored packet data to the RX pipeline 202 or the DMA access circuit 204.

A RX queue 216 can store information corresponding to each packet stored within the RX FIFO 214. Such information can include a double word (dword) count for the packet. In addition, other status bits may be included that are generated by an RX checksum module. Such status bits may indicate if a packet is standard, a layer 3 header checksum result, a layer 4 datagram checksum result, and an error indication.

A RX arbitrator 218 can receive information for a given packet from the RX queue 216, and according to such information, arbitrate the transfer of packet data from the RX FIFO 214 to the DMA access controller 204 or RX pipeline 202. More particularly, the RX arbitrator 218 can enable the transfer of particular voice packet data to the RX pipeline 202 while other types of packets can be forwarded to the DMA access circuit 204. Once a packet has been forwarded to a particular location, the DMA access circuit 204 can remove ("pop") the corresponding entry for the packet from the RX queue 216.

In this way, as packet data is being output by a RX FIFO 214, information on the packet is provided by an RX queue 216. According to such information, an RX arbitrator 218 can forward the packet data to a RX DMA circuit 204 or a RX pipeline 202.

The RX arbitrator 218 can be advantageously configurable according to values stored in the RX control registers 212. In one configuration, the RX arbitrator 218 can forward packets according to filtering information as described above. In another configuration, all packets from the RX FIFO 214 can be forwarded only to the RX DMA 204 (i.e., bypass the RX pipeline 202). Still further, in another configuration, packets from the RX FIFO 214 can be forwarded only to the RX pipeline 202 (i.e., bypass the RX DMA 204).

Figure 3:
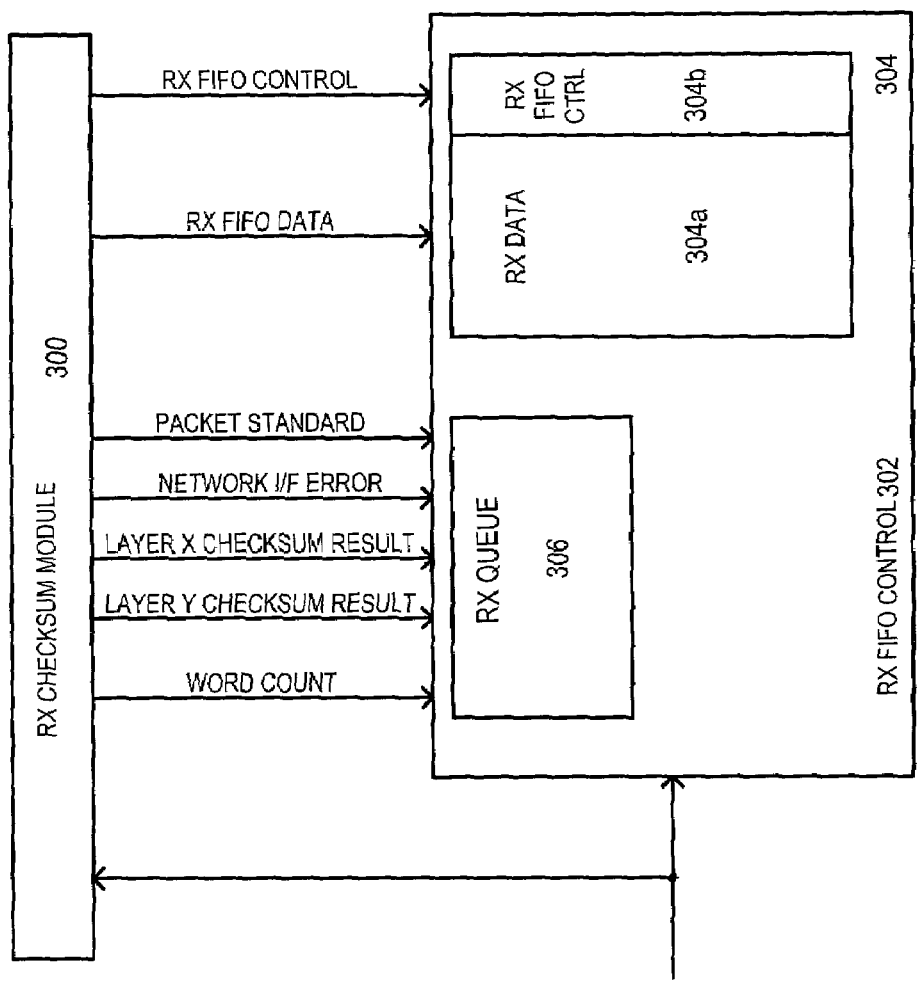
FIG. 3 is a block diagram of a receive checksum module and receive FIFO controller according to one embodiment.

Having described the general arrangement of a receive subsystem 200, more detailed examples of receive subsystem components will now be described. FIG. 3 provides a more detailed example of a RX checksum module 300 (that may correspond to item 206 in FIG. 2) and a RX FIFO controller 302 (that may correspond to item 208) in FIG. 2. The RX FIFO controller 302 is shown to include a RX FIFO 304 and a RX queue 306.

RX FIFO and RX Queue

A received packet, along with associated RX control data, can be stored in the RX FIFO 304. More particularly, a received packet can be stored as multiple entries in the RX FIFO 304, where each entry may include a packet dword (four bytes, in this particular example), as well as corresponding RX control data. In the particular arrangement of FIG. 3, the RX checksum module 300 can provide RX FIFO data to a first portion 304-a of each RX FIFO entry and provide RX FIFO control data to a second portion 304-b of each RX FIFO entry. In one embodiment, each RX FIFO 304 entry is capable of storing a 32-bit double-word (dword) of packet data and a corresponding 7 bits of RX FIFO control data.

RX FIFO control data may, in one embodiment, include dword alignment data, status information (i.e., indicating the start, middle and end of a packet), as well as layer identification values. Layer identification values can include a layer 2 bit, a layer 3 bit and a layer 4 bit. The particular bits are set according to whether the corresponding RX FIFO data belongs to a layer 3 header, layer 4 header, or a layer 5 header (or payload), respectively.

In one very particular configuration, an RX FIFO can be a 39×512 FIFO.

Figure 4:
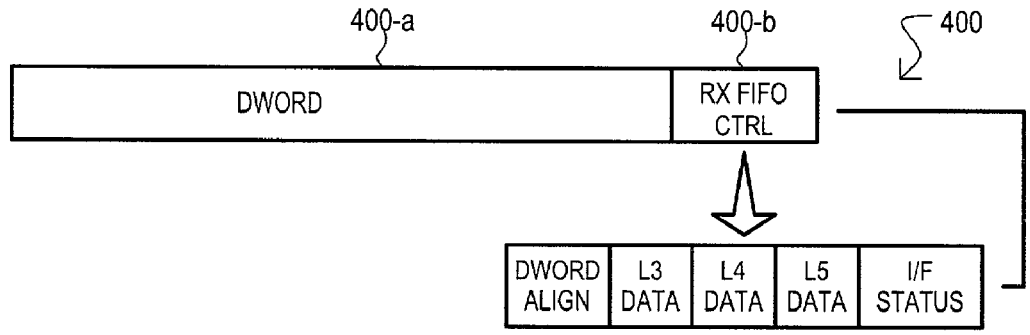
FIG. 4 is a diagram illustrating a receive FIFO entry according to one embodiment.

One example of a RX FIFO entry is shown in FIG. 4. The entry 400 includes a data portion 400-a and a control portion 400-b. The control portion 400-b can include the particular values discussed above. In the particular arrangement show, a DWORD ALIGN value may be a two bit value that indicates bit alignment within a packet. As is well understood, various standards may dictate a different bit order than others (e.g., FDDI vs. "Ethernet" and the like). A L5 value can be a one bit value that indicates when the FIFO dword is a part of a layer 5 header or a payload of a packet. A L4 bit can be a one bit value that indicates when the FIFO dword is a part of a layer 4 header.

Referring back to FIG. 3, a RX checksum module 300 may also provide RX control when the last dword of a packet is written into a RX FIFO 304. Such RX control data can be stored in the RX queue 306. Thus, the RX queue 306 can include packet data corresponding to each packet stored in the RX FIFO 304. In one embodiment, the RX control data stored in the RX queue 306 may include a PACKET STANDARD value, a NETWORK I/F ERROR value, a layer 3 header checksum result value, a layer 4 checksum result value, and a word count value.

A PACKET STANDARD value can indicate when the corresponding packet meets predetermined packet format criteria. In one a particular arrangement, the packet format criteria is set by packet filtering performed in the RX checksum module 300. More particularly, the PACKET STANDARD value can be set when a packet is a voice packet. Even more particularly, the PACKET STANDARD value can be set when a packet has a particular format, and includes header fields that match particular preset values and/or ranges.

A NETWORK I/F ERROR value can indicate the presence of one of many possible error conditions generated by a network interface, such as that shown as item 102 in FIG. 1.

A layer 3 checksum value can be set if the RX checksum module 300 generates a layer 3 header checksum value that matches a layer 3 header checksum transmitted with the packet. As but one example, a layer 3 header checksum can be an IP header checksum. Similarly, a layer 4 checksum value can be set if the RX checksum module 300 generates a layer 4 checksum value that matches a layer 4 checksum transmitted with the packet. In one particular arrangement, a layer 4 checksum can be a UDP checksum.

A word count value can indicate the size of the corresponding packet within the RX FIFO 304. Such a value may be in dwords, as but one example.

In this way, the RX checksum module 206 may monitor incoming a packet data and provide corresponding control data for each stored portion of a packet (such as the RX FIFO control values described). Such values can follow their corresponding packet data through the RX FIFO 304 and provide for faster packet processing. In addition, or alternatively, the RX checksum module 206 may generate RX control data corresponding to each "whole" packet. Such control data may include packet filter information, allowing certain packets, preferably voice packets, to be forwarded to a RX pipeline (such as 116 and 202), while other packets are written to a memory (such as 106).

Checksum Module State Machines.

A RX checksum module may include a processor and/or circuits to perform various filtering or checksum operations. It is understood that such operation may be executed by various circuits. As but one example, various filtering/ checksum steps may be accomplished by a processor according to a predetermine set of instructions. In such a case, values may be loaded into processor registers, and arithmetic/logic operations may be performed on such values to generate filter/checksum results. In addition, or alternatively, filtering steps may be implemented as circuits that may be described according to a function, in a higher level hardware design language (such as Verilog or VHDL). Subsequently, such a design may be used to form actual logic circuits by a synthesis steps. Of course, any such implementation may include custom designed circuit portions. Accordingly, to avoid unduly limiting the invention to one narrow implementatno, examples of RX checksum operations are described below in state diagram form.

Figure 5:
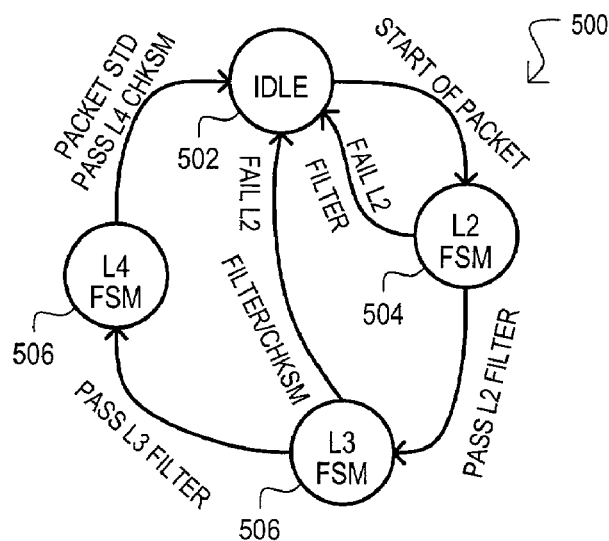
FIG. 5 is a state diagram showing one example of a receive checksum module according to one embodiment.

Referring now to FIG. 5, a state diagram is provided that shows one example of a state machine that may be included in a RX checksum module. The state diagram is designated by the general reference character 500 and is shown to include an idle state 502. An idle state may represent an empty processing pipeline in a RX checksum module. Upon a receiving packet data, a RX checksum module can perform a first filtering step 504. In the particular example of FIG. 5, a first filtering step can include a Layer 2 Filter State Machine (L2 FSM). A first filtering step 504 can examine Layer 2 information of a packet, compare such information against predetermined values, or ranges of values, and indicate if the Layer 2 information matches the predetermined values or range of values.

As shown in FIG. 5, if Layer 2 information of a received packet passes a Layer 2 filter, additional processing can occur according to a second processing step 506. If the Layer 2 information is filtered out, a filter fail indication can be generated and the state machine can return to the idle state 502. In one arrangement, such a result can force a packet valid bit to an invalid state.

A second processing step can be performed according to a Layer 3 Filter State Machine (L3 FSM). A second processing step 506 may examine Layer 3 information of a packet, compare such information against predetermined values, or ranges of values, and indicate if the Layer 3 information matches the predetermined values or range of values. In one particular case, a second processing step 506 may also include a checksum operation to ensure that Layer 3 information has not been corrupted in transmission.

As but one example, Layer 3 information may include an IP destination and/or source address. Predetermined Layer 3 address values can be stored within a RX control register such as that shown as item 212 in FIG. 2. Further, a second processing step 506 may include performing a layer 3 header checksum operation.

As shown in FIG. 5, if Layer 3 information of a received packet passes a Layer 3 filter, additional processing can occur according to a third processing step 508. If the Layer 3 information does not pass the filter, a filter fail indication can be generated and the state machine can return to the idle state 502. Similarly, if a Layer 3 checksum result does not match checksum information included within a packet, the state machine can return to the idle state 502. If a packet fails a filter or checksum, a packet status may be changed to invalid. As noted above, a step 506 may be programmable to bypass a check for various layer 3 address ranges.

A third processing step can be performed according to a Layer 4 Filter State Machine (L4 FSM). A third processing step 508 may examine Layer 4 information of a packet, compare such information against predetermined values, or ranges of values, and indicate if the Layer 4 information matches the predetermined values or range of values. In one particular case, a third processing step 508 may include a checksum operation to ensure that Layer 4 information has not been corrupted in transmission.

As but one example, Layer 4 information may include an UDP destination and/or source port value. Predetermined Layer 4 filtering values/ranges can be stored within a RX control register such as that shown as item 212 in FIG. 2. If a packet fails a layer 4 filter or checksum, a packet status may be changed to invalid. As noted above, a step 508 may be programmable to bypass a check for various layer 4 address ranges.

As shown in FIG. 5, if Layer 4 information of a received packet passes a Layer 4 filter and a Layer 4 checksum result, "packet standard" and checksum result indications can be generated, and the state machine can return to the idle state 502.

Having described the general operation of an RX checksum module, particular approaches to various header processing arrangements will now be described. One particular Layer 2 filtering state machine is set forth in a state diagram in FIG. 6 and designated by the general reference character 600. A Layer 2 state machine 600 may include an idle state 602. In an idle state, a Packet_Standard value may be set to "0." Once a packet is received, a start of packet indication SOP can result in the state machine proceeding to a media access control (MAC) address state 604. A MAC address state 604 can step through a MAC destination address and MAC source address. In one arrangement, such a step may include incrementing a byte count.

If a packet passes a MAC destination address filter, a state machine 600 may then proceed to a protocol check state 606. A state machine may proceed from a protocol check state 606 according to protocol information within a packet. In the particular arrangement of FIG. 6, a check for four values can be performed.

If protocol information has a value of <600 (hex), a state machine 600 may treat the currently read packet bytes as if packet value was compliant with an IEEE 802.3 protocol. At a service access point (SAP) state 608, a source SAP (SSAP) and destination SAP (DSAP) may be examined for subnetwork access protocol (SNAP) encapsulation. Thus, if SSAP and DSAP values do not equal AA (hex), the state machine 600 can return to the idle state.

A state machine 600 may then examine a control byte (CTL) at a control state 610. A control state 610 can ensure that the received packet is not an unwanted type. For example, if a control byte indicates a packet is a test packet, a disconnect request packet, etc., a state machine 600 may return to an idle state.

Following a control state 610, at an organization state 612, a packet may be further examined. In the particular example of FIG. 6, if such packet information is not equal to 00 (hex), a state machine may return to the idle state.

A state machine 600 may also account for various packet encapsulation-type schemes. Such a capability may be particularly advantageous due to importance of reducing latency in voice data. In the particular example of FIG. 6, a state machine 600 may account for packets transmitted by way of virtual local area networks (VLAN), as well as packets transmitted using multiprotocol label switching (MPLS). Of course, these two particular examples should not be construed as limiting the invention thereto.

Figure 6:
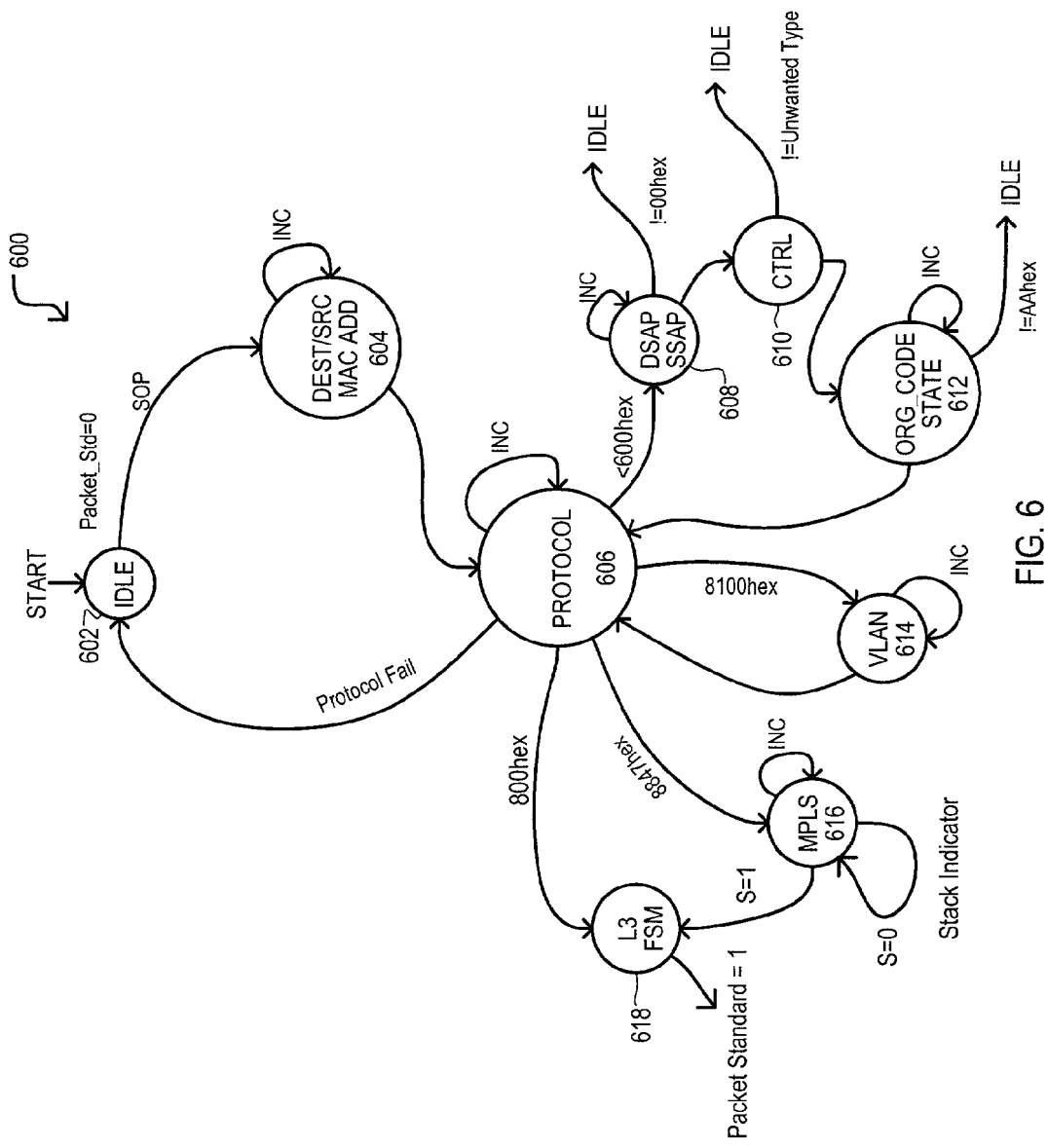
FIG. 6 is a state diagram showing a Layer 2 filter according to one embodiment.

As shown in FIG. 6, if protocol information has a value of 8100 (hex), the packet can be considered to include a VLAN header field. The state machine can step through VLAN header information at a VLAN state 614.

In a similar fashion, if protocol information has a value of 8847 (hex), the packet can be considered to include MPLS header fields. The state machine can step through MPLS header information at a MPLS state 616. At an MPLS state 616, bytes may be examined until a stack indicator bit (S) is detected. This may enable MPLS "shim" information to be bypassed.

Of course, the various protocols (802.3, VLAN, MPLS) may be encapsulated within each other. For example, Layer 2 information could include a VLAN header field, 802.3 fields and MPLS fields, and various combinations thereof.

Referring once again to FIG. 6, if protocol information equals 0800 (hex) or following a MPLS state 616 a state machine may proceed to a Layer 3 filter state machine 618 (also shown as 506 in FIG. 5).

It is noted that as Layer 2 data of a valid packet is read, for every two bytes of Layer 2 information, a Layer 2 Data value can be set to one. As noted in conjunction with FIG. 4, a Layer 2 data value can be included as a FIFO control bit to allow particular packet processing steps as will be described at a later point herein.

Having described one particular Layer 2 filtering state machine, an example of a Layer 3 filtering state machine will now be described with reference to FIG. 7. A Layer 3 filtering state machine is designated by the general reference character 700, and may filter packets transmitted according to the Layer 3 Internet Protocol (IP).

Initially, a Layer 3 data value may be set to one. As noted in conjunction with FIG. 4, a Layer 3 data value can be included as a FIFO control bit to allow particular packet processing steps as will be described at a later point herein. In addition, a checksum operation for L3 header information can begin.

At a version/length state 702, a state machine 700 may compare IP protocol version information. If the IP protocol of the current packet does not match allowable version values, a state machine 700 may return to an idle state (such as that shown as 602 in FIG. 6). In this way, voice packets may be filtered according to Layer 3 protocol version.

A state machine 700 may proceed by stepping through type of service (TOS), total length, and identification (ID) information at states 704, 705 and 706.

A state machine 700 may then proceed to a fragment offset state 708. A fragment offset state 708 may check for an indication that a datagram is fragmented. In that particular example of FIG. 7, fields in two bytes are examined for bits (set to one) that would indicate fragmentation. If any such bits are detected, a state machine may return to idle 700 resulting in a packet failing to pass a Layer 3 filter.

At a time-to-live (TTL) state 710, a state machine 700 can examine TTL information in an IP header. If such information indicates the packet has been in existence too long (TTL=00(hex)), a state machine may return to an idle state. In this way, packets may be filtered according to Layer 3 TTL information.

At a Layer 3 protocol state 712, protocol information in an IP header can be examined. In the example of FIG. 7, if such information indicates that the packet does not include UDP protocol information, a state machine may return to an idle state. In this way, packets may be filtered according to Layer 4 protocol information.

At a Layer 3 header checksum state 714, a Layer 3 checksum value from a packet header can be stored. Such a value may then be used to in a Layer 3 checksum operation. If such a checksum operation fails, a state machine 700 may return to an idle state. It is further noted that in the particular example shown, a Layer 4 checksum may be a "pseudo" header checksum. Consequently, a Layer 4 checksum operation can include the values of an IP source and destination address. Thus, a Layer checksum operation can begin following a state 714.

Figure 7:
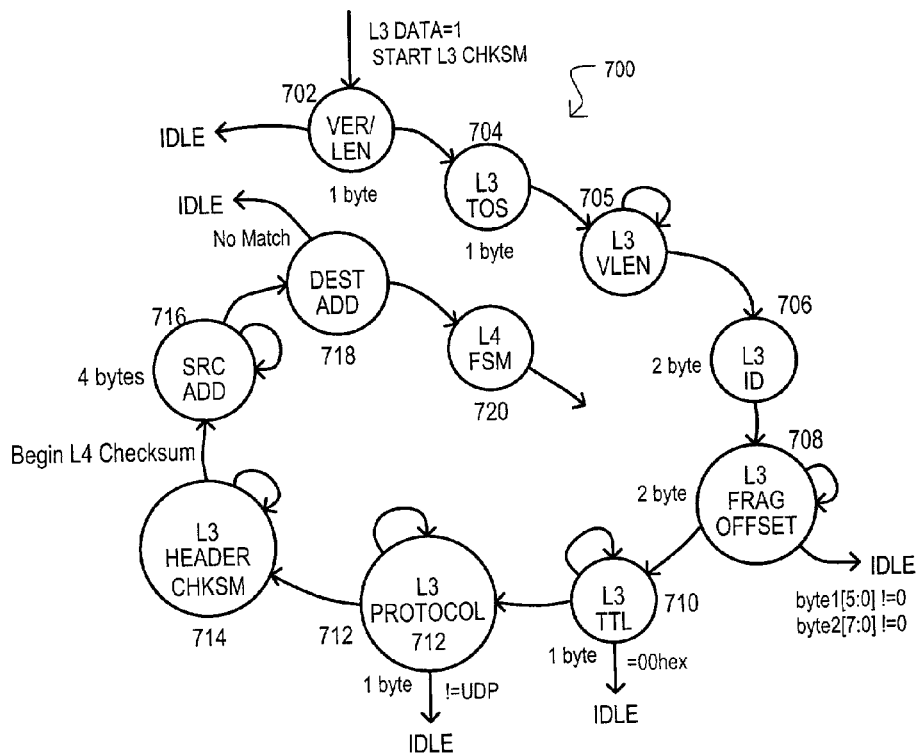
FIG. 7 is a state diagram showing a Layer 3 filter according to one embodiment.

As shown in FIG. 7, at a source address state 716, a byte count may be incremented to count through an IP source address. At a destination address state 718, a byte count may be incremented to compare an IP destination address with stored IP destination addresses, or ranges of IP destination address. If the IP destination address of a packet does not match a stored IP address or range of addresses, a state machine 700 may return to an idle state. If the packet IP destination address matches a stored value, or range of values, a state machine 700 may proceed to a Layer 4 filter state machine 618 (also shown as 508 in FIG. 5).

Having described particular Layer 2 and Layer 3 filter state machines, an example of a Layer 4 filtering state machine will now be described with reference to FIG. 8. A Layer 4 filter state machine is designated by the general reference character 800, and may filter packets transmitted according to the Layer 4 User Datagram Protocol (UDP).

Figure 8:
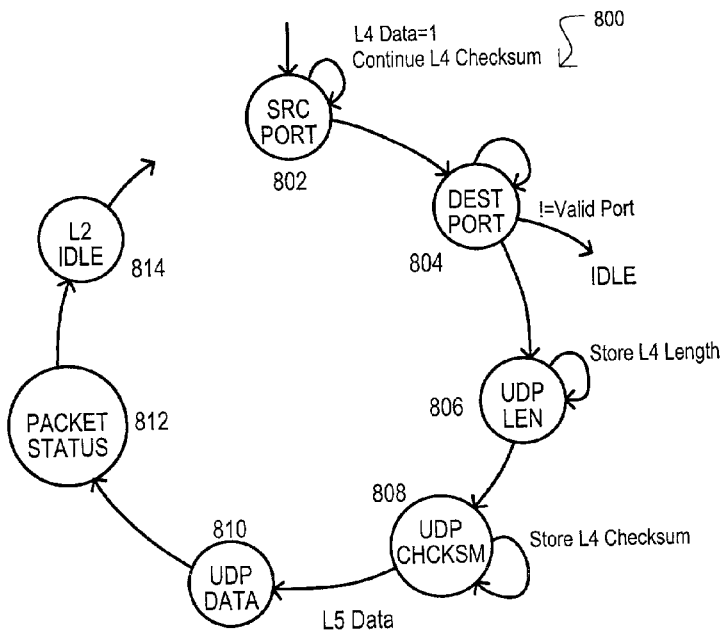
FIG. 8 is a state diagram showing a Layer 4 filter according to one embodiment.

Referring now to FIG. 8, a Layer 4 filter state diagram is designated by the general reference character 800 and may include setting a Layer 4 data value to one. As in the case of the Layer 2 filter and Layer 3 filter examples, a Layer 4 data value can be included as a FIFO control bit to allow particular packet processing steps to take place. Further, a Layer 4 checksum operation, previously started with the IP source address, can continue.

At a source port state 802, a byte count may be incremented to count through a source port value. At a destination port state 804, a destination port value 804 may be checked to see if it matched a predetermined value or range of values. In one particular example, at a destination port state 804, a state machine may filter according to odd or even port values within a given range. If a match does not exist, a state machine 800 may return to an idle state.

At a UDP length state 806, a UDP length value may be stored. Similarly, at a UDP checksum state 808, a checksum value can be stored.

Prior to a UDP data state 810, a Layer 5 Data value can be set to one. Such an arrangement can enable other circuits to distinguish between UDP payload and other portions of a packet. At a UDP data state 810, a byte value may be incremented according to a previously stored UDP length value.

At a packet status state 812, a packet status value can be generated that indicates a "normal" packet (e.g., a packet that has passed Layer 2, 3 and 4 filter requirements). Following a packet status state 812, a state machine 800 may return to an idle state.

RX Pipeline.

Referring back to FIG. 2, it will be recalled that a receive subsystem 200 may include a receive (RX) pipeline 202. One example of a RX pipeline is shown in more detail in FIG. 9. An RX pipeline 900 can pre-process packets to increase overall packet processing speed. More particularly, the RX pipeline 900 can strip layer 2, layer 3 and layer 4 headers from a packet and forward the resulting payload for processing. A RX pipeline 900 may also extract selected header information that may be used to process a packet.

Figure 9:
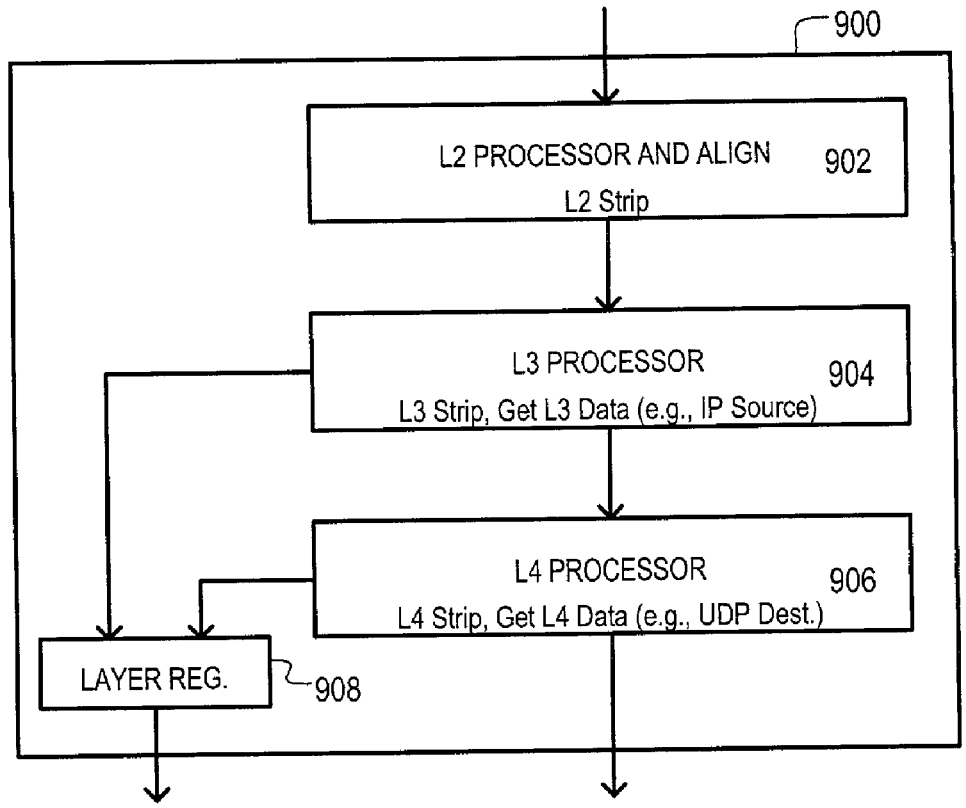
FIG. 9 is a block diagram of a receive pipeline according to one embodiment.

The RX pipeline 900 of FIG. 9 includes a layer 2 stage 902, a layer 3 stage 904, a layer 4 stage 906. The various stages (902, 904 and 906) may receive processing information from registers, such as those that may included in RX control registers (shown as item 212 in FIG. 2).

A layer 2 stage 902 may remove ("strip") a layer 2 header from a packet. Further, the layer 2 stage 902 may align dwords in the packets according to alignment information. As noted in conjunction FIG. 2, a RX pipeline 900 may receive data from a RX FIFO. Thus, data received by a layer 2 stage 902 may have the format shown in FIG. 4. A layer 2 stage 902 may remove data words having a Layer 2 data value of one, while Layer 3 and Layer 4 values are zero.

It is noted that in many approaches, Layer 2 information may be byte aligned, while Layer 3 and Layer 4 data may be dword aligned. Thus, once packet information is aligned according Layer 3 and Layer 4 information, such information, including payload, may be dword aligned for faster processing.

A layer 3 stage 904 may strip a layer 3 header from the packet, in the same general fashion as a layer 2 stage 902. That is, Layer 3 dwords can be identified by a Layer 3 data value of one and a Layer 4 value of zero.

A layer 3 stage 904 may also store selected layer 3 information into a layer register 908. Stored layer 3 information may include information that may be used to forward a voice packet to a desired location. More particularly, the layer 3 information can include a Internet protocol (IP) source address. It is noted that layer 3 portions of a packet can be rapidly distinguished from other packet portions by forwarding layer identifying bits (such as a L3 data value shown in FIG. 4) with packet data.

In a similar fashion to the layer 3 stage 904, the layer 4 stage 906 may strip a layer 4 header from the packet and store selected layer 4 information in the layer register 908. The stored layer 4 information can also be information that may be used to forward a voice packet to a desired location. More particularly, the layer 4 information can include a User Datagram Protocol (UDP) destination port value. Further, layer 4 portions of a packet can be rapidly distinguished from other packet portions by forwarding layer identifying bits (such as a L4 data value shown in FIG. 4) with packet data.

By sequentially stripping layer 2, layer 3 and layer 4 headers, the RX pipeline 908 can output a layer 4 datagram for processing. This can increase packet processing speed by placing the packet in an easier format (e.g., a UDP datagram) for a processor, or the like. Preferably, an RX pipeline 908 may be implemented by custom circuits which may provide more rapid processing speed than a general purpose processor.

Figure 10:
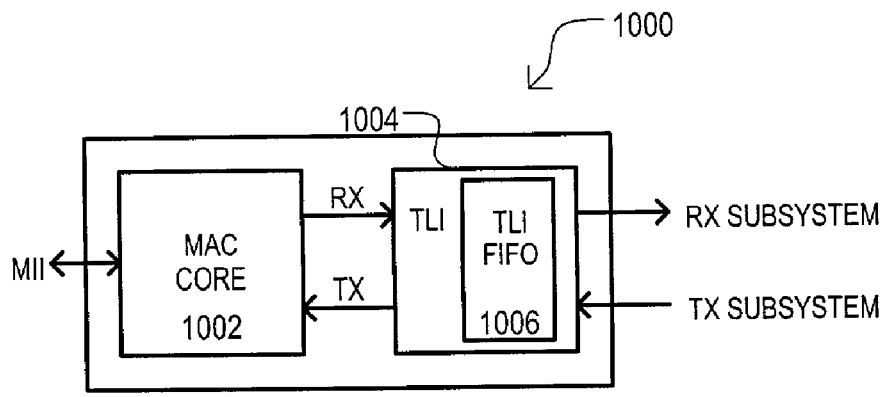
FIG. 10 is a block diagram of a network interface according to one embodiment.

FIG. 10 provides a more detailed example of a network interface according to one embodiment. The network interface is designated by the general reference character 1000 and may correspond to item 102 of FIG. 1. The network interface 1000 may include a media access control (MAC) core 1002, which is connected to a media independent interface MII. The MAC core 1002 can provide receive data (Rx) to a transaction layer interface (TLI) 1004, and receive transmit data (Tx) from the TLI 1004.

A MAC core 1002 can forward packets received from the MII to the TLI 1004. The TLI 1004 can copy received packet data into a TLI FIFO 1006. In a receive mode, a TLI FIFO 1006 can be controlled to ensure that an entire data packet is received and stored. As but one example, if the MAC core 1002 is connected to a medium that relies on collision detection, the TLI FIFO 1004 can be "rewound" in the event of a packet collision.

The TLI 1004 may also monitor the MAC core 1002 for error conditions (such as a collision, as but one example). Such errors can be forwarded by the TLI 1004 as status data for a receive subsystem (such as 104 of FIGS. 1 and 200 of FIG. 2). Such error signals may be logically ORed by the receive subsystem to generate a network interface error signal, such as that shown in FIG. 3.

Figure 11:
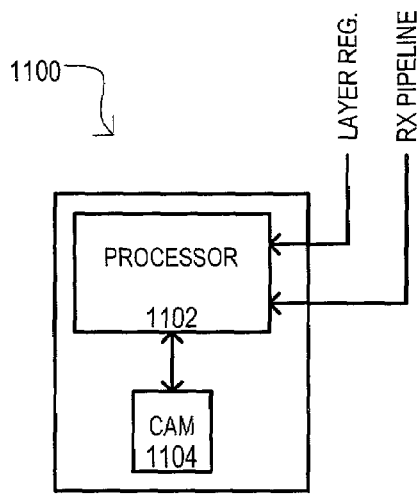
FIG. 11 is a block diagram of a receive processor subsystem according to one embodiment.

Referring now to FIG. 11, a more detailed example of a receive processor subsystem is set forth in a block diagram. The receive processor subsystem 1100 may correspond to item 108 of FIG. 1, and include a processor 1102 and a content addressable memory (CAM) 1104. The processor subsystem 1100 can receive extracted header values from a layer register (such as item 908 of FIG. 9) and pre-processed packets from a RX pipeline (such as 116 of FIG. 1, 202 of FIG. 2, and 500 of FIG. 5).

A CAM 1104 can enable fast comparisons between extracted header information and values stored in the CAM 1104. This can allow voice packets to be rapidly matched with a destination (such as a memory location).

Figure 12:
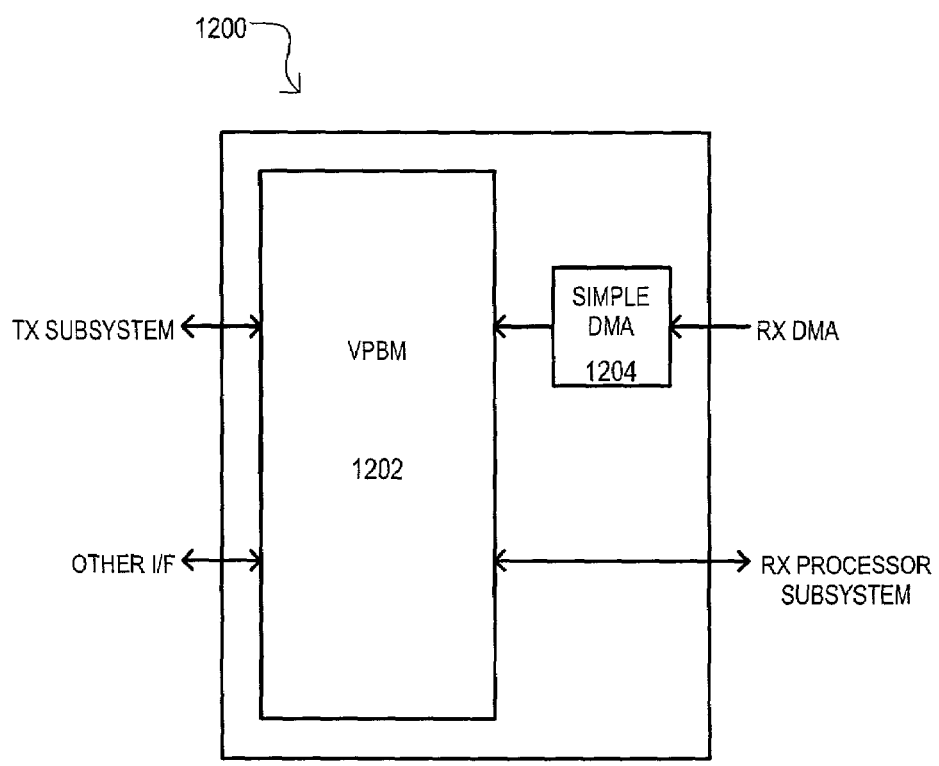
FIG. 12 is block diagram of a packet memory according to one embodiment.

FIG. 12 shows one example of a packet memory, such as that shown as 106 in FIG. 1. The packet memory 1200 may include a voice packet buffer memory (VPBM) 1202 and a direct memory access (DMA) controller 1204. A VPBM 1202 can be a random access memory (RAM). Voice data may be stored according to channel value in particular locations within the RAM. More particularly, various voice channels may be stored at locations offset with respect to a base address. Entries in a look-up table (such as a CAM 1104) can generate offset values corresponding to particular voice channels. A VPBM 1202 may receive transferred voice packet data from the DMA controller 1204 and/or through the control of a receive processor subsystem 1100. In addition, the particular VPBM 1202 of FIG. 12 can have a data path to a transmit subsystem and other interfaces.

A DMA controller 1204 may control data transfers between a RX FIFO (such as 112 of FIG. 1, or 214 of FIG. 2, or 304 of FIG. 3) and a VPBM 1202. A DMA controller 1204 may operate in conjunction with a direct memory controller (such as 114 and/or RX DMA 204) to facilitate direct memory writes of packet data to the VBPM 1202.

Accordingly, it is understood that while various embodiments have been described in detail, the present invention could be subject various changes, substitutions, and alterations without departing from the spirit and scope of the invention. Accordingly, the present invention is intended to be limited only as defined by the appended claims.

What is claimed is:

1. A system for distinguishing between types of voice packets, comprising:
   a voice packet memory having a plurality of storage locations for storing voice packet data;
   a pre-processing path including a layer register that stores selected header field data from the voice packet data coupled to the voice packet memory that includes a plurality of layer processors that remove header information from voice packet data;
   a direct memory access path coupled to the voice packet memory that transfers voice packet data to the voice packet memory; and
   a receive process subsystem that receives header field data from the layer register and voice packet data from the pre-processing path and generates voice packet memory address locations for the voice packet data.

2. The system of claim 1, wherein:
   the header field data includes an Internet protocol source address.

3. The system of claim 1, wherein:
   the header field data includes a User Datagram Protocol (UDP) destination port value.

4. A system for processing voice-over-network data packets, comprising:
   a voice packet memory having a plurality of storage locations;
   a receive subsystem that includes
      a first data path for transferring voice data packets to the voice packet memory, and
      a second data path for removing and storing header information of a voice data packet and outputting voice data; and
   a receive processor subsystem that receives stored header information from the second path and generates voice packet memory address locations for voice data output from the second data path.

5. The system of claim 4, wherein:
   the receive subsystem further includes a receive first-in-first-out buffer (FIFO) having a receive FIFO input that receives voice data packets and a receive FIFO output coupled to the first data path and second data path.

6. The system of claim 4, further including:
   a network interface coupled to the receive subsystem that includes
      a media access control core coupled to a media interface for decoding voice data packets transmitted on a transmission media; and
      a transaction layer first-in-first-out buffer (FIFO) that stores portions of voice data packets decoded by the media access control core.

7. The system of claim 4 wherein:
   the receive subsystem further includes
      a receive first-in-first-out buffer (FIFO) having a plurality of entries, each receive FIFO entry storing voice packet data and corresponding control data for the voice packet data, the control data indicating packet layer information corresponding to the voice packet data; and
      a receive queue having a plurality of queue entries, each queue entry storing queue information for each packet stored in the receive FIFO, the queue information including a packet standard value that indicates when the packet corresponding to the entry passes predetermined header processing filters.

8. The system of claim 7, wherein:
   the control data indicates voice data packet corresponding to a layer 3 packet header and a layer 4 packet header.

9. The system of claim 7, wherein:
   the control data indicates starting portions of packet, middle portions of the packet, and ending portions of the packet.

10. The system of claim 7, wherein:
    the packet standard value indicates that a packet layer 3 field matches at least one predetermined layer 3 address.

11. The system of claim 7, wherein:
    the packet standard value indicates that a packet layer 4 field matches at least one predetermined value layer 4 address.

12. The system of claim 7 wherein:
    the second data path forwards voice packet data of an entry from the receive FIFO according to the control data for the entry.

13. The system of claim 12, wherein:
    the second data path includes
       an input coupled to the receive FIFO,
       a layer 2 processor that selectively removes layer 2 information from voice packet data, and
       a layer 3 processor that selectively removes layer 3 information from voice packet data.

14. The system of claim 13, wherein:
    the layer 3 processor stores selected layer 3 information.

15. The system of claim 13, further including:
a layer 4 processor that selectively removes layer 4 information from voice packet data.

16. The system of claim 15, wherein:
the layer 4 processor stores selected layer 4 information.

17. The system of claim 7, further including:
a direct memory access controller that transfers voice packet data of an entry from the receive FIFO according to the control data for the entry.

18. The system of claim 17, further including:
a receive arbitrator coupled to the receive queue that controls the transfer of voice packet data from the receive FIFO, the second data path and direct memory access controller according to the queue information of the receive queue.

\* \* \* \* \*